(12) United States Patent
Xu et al.

(10) Patent No.: US 9,870,353 B2
(45) Date of Patent: Jan. 16, 2018

(54) PRE-POPULATING A FORM (71) Applicant: Hewlett Packard Enterprise Development LP, Houston, TX (US)

(72) Inventors: Bing Xu, Shanghai (CN); Yariv Snapir, Yehud (IL); Leonid Reznik, Yehud (IL); Gad Sakin, Yehud (IL); Wen Lin, Shanghai (CN)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 15/032,598

(22) PCT Filed: Oct. 31, 2013

(86) PCT No.: PCT/CN2013/086289
§ 371 (c)(1),
(2) Date: Apr. 27, 2016

(87) PCT Pub. No.: WO2015/062009
PCT Pub. Date: May 7, 2015

(65) Prior Publication Data
US 2016/0275062 A1  Sep. 22, 2016

(51) Int. Cl.
G06F 17/00 (2006.01)
G06F 17/24 (2006.01)
G06F 3/0484 (2013.01)
(52) U.S. Cl.
CPC .......... *G06F 17/243* (2013.01); *G06F 3/0484* (2013.01)

(58) Field of Classification Search
CPC ..................................................... G06F 17/243
See application file for complete search history.

(56) References Cited

U.S. PATENT DOCUMENTS

| 6,182,059 B1 | 1/2001 | Angotti et al. | |
| 7,200,806 B2 | 4/2007 | Sahu | |
| 8,209,218 B1* | 6/2012 | Basu | G06Q 10/0637 705/7.36 |
| 8,239,752 B1 | 8/2012 | Perelman et al. | |
| 8,452,676 B1* | 5/2013 | Talan | G06F 17/243 705/19 |
| 2004/0172347 A1* | 9/2004 | Barthel | G06Q 10/10 705/31 |
| 2005/0234744 A1* | 10/2005 | Bauer | G06Q 50/24 705/3 |

(Continued)

FOREIGN PATENT DOCUMENTS

WO  WO-0246872 A2  6/2002

OTHER PUBLICATIONS

Novell, How Novell Service Desk incidents Are Assigned to Technicians, Feb. 22, 2003, 2 pages http://www.novell.com/support/kb/doc.php?id=7012227.

(Continued)

*Primary Examiner* — Laurie Ries (57) ABSTRACT

Pre-populating a form can include receiving a first input that describes a problem from a first user. Pre-populating a form can include associating a category with the first input. Pre-populating a form can include selecting a first form based on the category. Pre-populating a form can include pre-populate the first form based on a second input provided by a second user to a second form belonging to the category.

15 Claims, 7 Drawing Sheets

(56) References Cited

U.S. PATENT DOCUMENTS

| | | | |
|---|---|---|---|
| 2006/0041869 A1 | 2/2006 | Houston et al. | |
| 2006/0085750 A1* | 4/2006 | Easton, Jr. | G06F 9/4446 715/708 |
| 2006/0212771 A1* | 9/2006 | Fabbrocino | G06F 11/0793 714/746 |
| 2006/0248054 A1* | 11/2006 | Kirshenbaum | G06F 17/30705 |
| 2006/0265258 A1* | 11/2006 | Powell | G06Q 10/10 705/327 |
| 2009/0043669 A1* | 2/2009 | Hibbets | G06Q 30/0601 705/26.1 |
| 2009/0043882 A1* | 2/2009 | Hibbets | G06Q 10/10 709/224 |
| 2010/0100490 A1 | 4/2010 | Lewis-Hawkins | |
| 2010/0274618 A1 | 10/2010 | Byrd et al. | |
| 2012/0036422 A1 | 2/2012 | Mullen et al. | |
| 2012/0089641 A1* | 4/2012 | Wilde | G06F 17/30672 707/771 |
| 2012/0095819 A1* | 4/2012 | Li | G06Q 30/02 705/14.23 |
| 2012/0102405 A1* | 4/2012 | Zuckerman | G06F 19/363 715/733 |
| 2012/0246576 A1* | 9/2012 | Baldwin | G06Q 10/10 715/751 |
| 2012/0330798 A1* | 12/2012 | Fox | G06Q 40/02 705/30 |
| 2013/0013345 A1* | 1/2013 | Wallquist | G06Q 40/08 705/4 |
| 2013/0198072 A1* | 8/2013 | Piratla | G06Q 40/02 705/43 |
| 2013/0252221 A1* | 9/2013 | McNutt | G09B 7/00 434/350 |
| 2013/0275528 A1* | 10/2013 | Miner | H04L 51/18 709/206 |
| 2013/0325611 A1* | 12/2013 | Delug | G06Q 30/0257 705/14.55 |
| 2014/0188681 A1* | 7/2014 | Shahghasemi | G06Q 20/22 705/37 |

OTHER PUBLICATIONS

State Intellectual Property Office of the P.R. China, international Search Report and Written Opinion, dated Jul. 30, 2014, 7 pages, Beijing, China.

* cited by examiner

PRE-POPULATING A FORM

BACKGROUND

Ticketing systems have been used to report information technology (IT) related problems. A ticketing system may allow a user to provide a description of a problem to a third party. A ticketing system may be used to coordinate a response to the description of the problem.

DETAILED DESCRIPTION

An input from a user can describe a problem. The input can be received at a provider, e.g., at a computing device associated with the provider. The provider, e.g., a representative of the provider, can assign a representative to resolve the problem. The representative can be selected by correlating the description from the user with a number of descriptions of a number of resolved problems. The provider can confirm that the number of resolved problems have been resolved. Assigning a representative to resolve a problem based on the correlation of the problem description with a description of a confirmed resolved problem can reduce the cost associated with resolving the problem by limiting the interaction that the representative has with the user.

As used herein, a provider can be an entity that provides a number of offerings. For example, a provider can be an information technology (IT) personal, a corporation, a non-profit organization, and/or a government agency, among other examples of a provider. A provider can provide an offering through a representative of the provider. A corporation can, for example, offer customer assistance to a customer through a service representative. The corporation can be the provider and the service representative can be the representative of the provider.

Offerings can include products and services. For example, a service offering can include a service that resolves a problem that a user has and/or a service that provides assistance to a user, among other types of service offerings. A product offering, referred to herein as a product, can include a product that the provider produces, a product that the provider sells, a product that the provider services, and/or a product that is associated with the provider.

A user can use and/or purchase an offering provided by the provider. A user may desire assistance with some aspect of the offering. For example, the user may desire assistance from the provider when an offering is not functioning properly and/or when the user is dissatisfied with the performance of the offering, e.g., when the user experiences a problem. The provider can provide a ticketing system to a user to receive a description of a problem that the user is experiencing.

In a number of previous examples, a user provides a number of inputs to a ticketing system via a ticket. The number of inputs can describe a problem that the user is experiencing. In a number of previous examples, a ticket may include a number of detailed questions and/or fields that a user has to provide answers for. The user may not have answers for the detailed questions. The user may become frustrated with the number of detailed questions. The provider may have to contact the user to inquire about questions that are not answered.

In a number of previous examples, a ticket may include a limited number of basic questions. The user may respond to the basic questions and submit the ticket to the provider. The provider may have to contact the user to further inquire about the problem with more detailed questions than those found in the basic questions. In both examples, a provider may need to contact the user to further inquire about the problem that the user is experiencing. Contacting the user can lengthen the time required to resolve the problem and can add to the costs associated with resolving the problem.

In a number of examples, a ticket can be pre-populated with answers to a number of questions. Pre-populating a ticket can reduce the number of questions that a user has to answer. A pre-populated ticket can ensure that all of the questions are answered and that the questions needed to assign a representative to resolve the problem have been answered. Pre-populating a ticket can reduce the interactions that a provider, e.g., a representative of the provider, has with a user in assigning a representative to resolve the question and/or resolve the ticket. Reducing the interactions between the provider and the user can reduce the cost associated with resolving the problem and reduce the time needed to resolve the problem.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
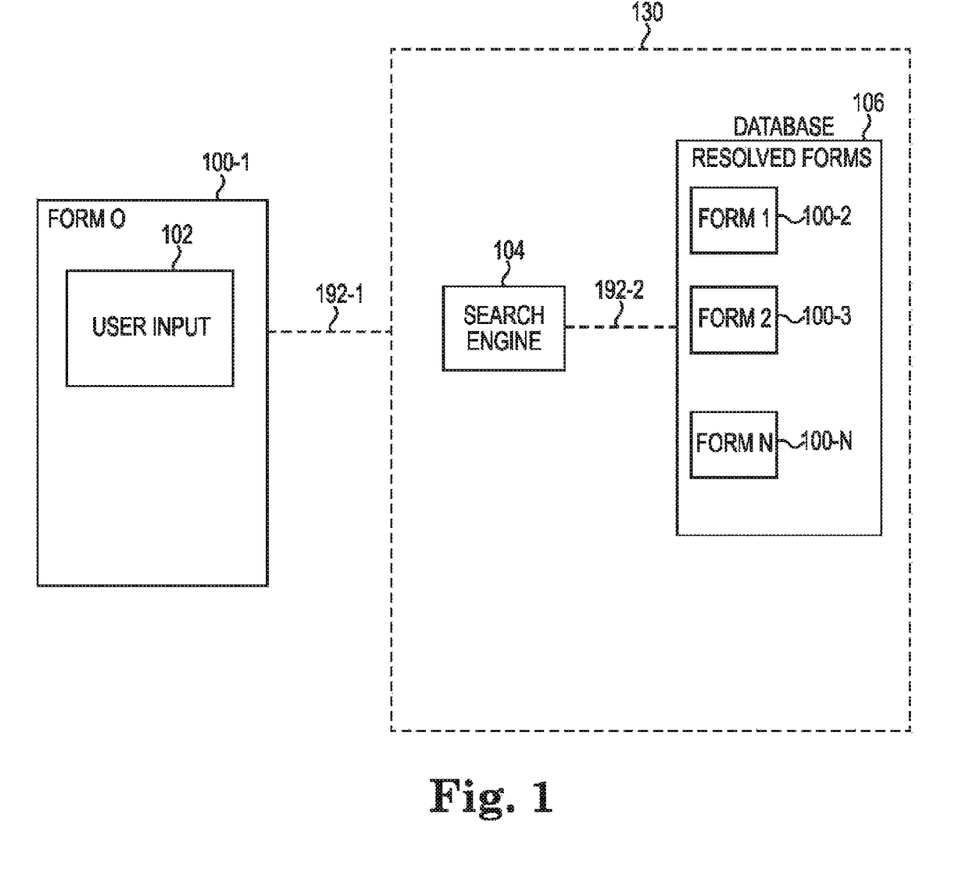
FIG. 1 illustrates a block diagram of an example of categorizing input from a user according to the present disclosure.

FIG. 1 illustrates a block diagram of an example of categorizing input from a user according to the present disclosure. FIG. 1 includes a form 100-1, a search engine 104, and a database 106.

A form 100-1 can be used to send an input, e.g., description of a problem, to a provider 130. In a number of examples, a user can send an input to a provider 130 via email, instant message, and/or text, among other forms of communication. A form can include a number of fields, e.g., variables. Form 100-1 includes a field 102 with a user input, e.g., value. In FIG. 1, the field 102 can be a text field that accepts text. Other types of fields, e.g., variables, can be included in the form 100-1.

In a number of examples, the user enters input into the field 102. The input can be provided to the search engine 104. The search engine can search through a number of resolved forms, e.g., resolved form 100-2, a resolved form 100-3, . . . , and a resolved form 100-N, e.g., referred to herein as resolved forms 100-2, . . . , 100-N, to find a resolved form that can be correlated with the form 100-1.

The form 100-1 can be correlated with resolved forms 100-2, . . . , 100-N by correlating a categorization associated with form 100-1 with a categorization associated with at least one of the resolved forms 100-2, . . . , 100-N. The categorization associated with the form 100-1 and/or forms 100-2, . . . , 100-N can include a categorization of the input to field 102 and/or any other field that may be expressed in the form 100-1 and forms 100-2, . . . , 100-N, among other categorization systems discussed below.

As used herein, a categorization can include an understanding of a problem and/or the nature of the user input. A categorization can be provided by a provider 130 and/or the search engine 104. For example, if a user provides a description, e.g., "cannot send emails", as input to field 102 in form 100-1, then the form 100-1, the description, e.g., user input, and/or the problem can be categorized as an problem dealing with an "email agent" and an "outbound email." In another example, a description, "my laptop cannot connect to any wireless network", can be categorized as a problem dealing with a "wireless network" and/or a "wireless connection," among other possible categorizations.

Figure 2:
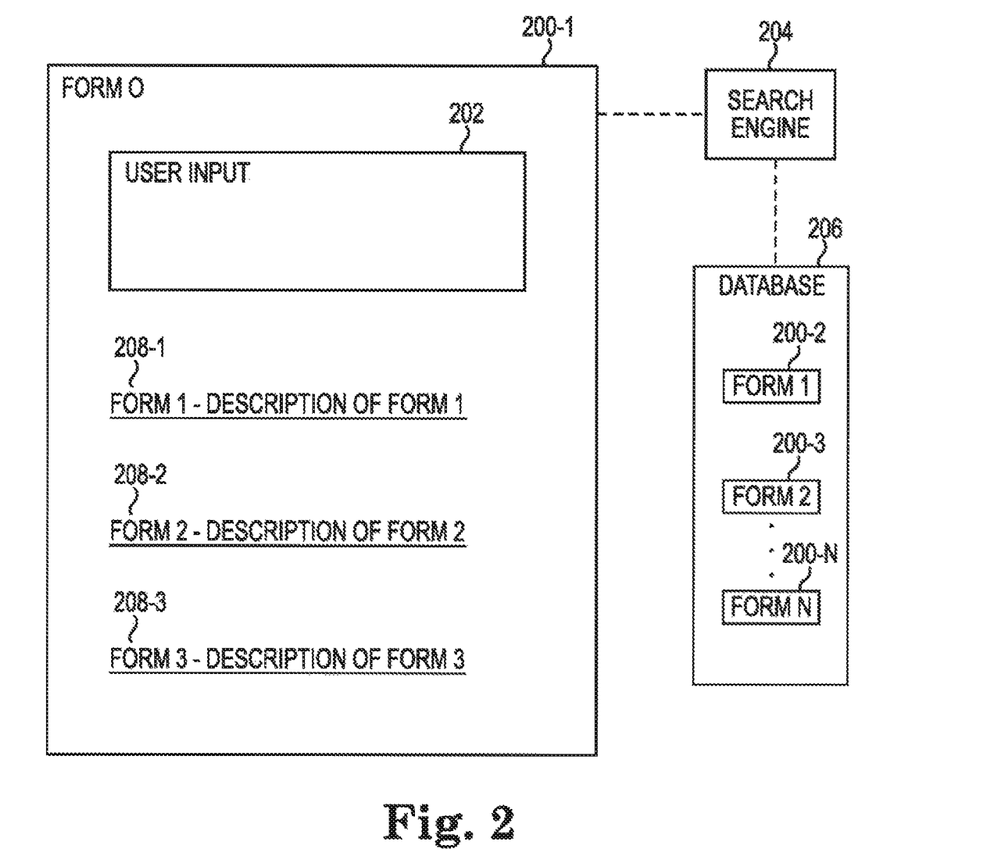
FIG. 2 illustrates a block diagram of an example of selecting a form according to the present disclosure.

A user can ensure that the provider 130 understands the problem and/or the nature of the input by reviewing the categorization and/or by reviewing the forms that are presented to the user based on the categorization. For example, a user can be presented with a number of forms that contain fields that are pre-populated with the information that expresses the categorization of the input provided by the user. FIG. 2 gives an example of presenting a number of forms to a user based on a categorization of the user input provided through field 102.

A search engine can be hosted on a computing device that hosts the form 100-1 and/or on a different computing device than the computing device that hosts the form 100-1. The form 100-1 can be coupled to the search engine 104 by coupling a computing device that hosts the form 100-1 to a computing device that hosts the search engine 104. The search engine 104 is coupled to the database 106 by coupling a computing device that hosts the search engine to a computing device that hosts the database 106. In a number of examples, a database 106 can be hosted on a same computing device as the search engine 104. The search engine 104 is coupled to form 100-1 via a communication link, e.g., path, 192-1. The search engine 104 is coupled to database 106 via a communication link 192-2. The communication link 192-1 and the communication link 192-2 can be logical communication links and/or physical communication links.

In a number of examples, the provider 130 can receive the input at a search engine 104 via the communication link 192-1. The search engine 104 can associate the form 100-1 with a number of the forms 100-2, . . . , 100-N stored in the database 106. The search engine 104 can assign a number of categories to the form 100-1 by analyzing the input provided by a user. The search engine 104 can access a number of forms 100-2, . . . , 100-N from database 106 and a number of associated categories. The search engine 104 can select a form from the number of forms 100-2, . . . , 100-N based on a category that is the same as or correlated to the category assigned to the form 100-1. In a number of examples, the search engine can select a subset of forms from the number of forms 100-2, . . . , 100-N. The search engine can associate the form 100-1 with the subset of the number of forms 100-2, . . . , 100-N.

The number of forms 100-2, . . . , 100-N can include forms that have been resolved. The forms 100-2, . . . , 100-N can represent tickets that have previously been submitted to the provider 130 and that have previously been resolved. For example, the form 100-2 can belong to a "networking" category, because the problem described by a user in the form 100-2 is a networking problem. The form 100-2 can have been resolved. The form 100-2 can be resolved after a form has been assigned to a representative and after the representative has resolved the problem associated with the form 100-2. In a number of examples, the form 100-2 can also be considered resolved when the user confirms to the provider 130 that the problem is resolved, when a representative that did not resolve the problem confirms that the problem has been resolved, and/or when a representative that resolved the problem confirms that the problem has been resolved.

The number of forms 100-2, . . . , 100-N, that a user can review after the search engine 104 selects and presents the number of forms 100-2, . . . , 100-N to the user, can be reduced by requiring that the number of forms 100-2, . . . , 100-N be resolved. A user can select a form to create an instance of the selected form that is pre-populated with the values, e.g., input, associated with the selected form.

In a number of examples, the form 100-1 and the number of forms 100-2, . . . , 100-N can be based on a number of form templates. For example, a form 100-1 can be an instance of a basic form template. The basic form template can be a first form that a user encounters when creating a ticket. Each of the number of forms 100-2, . . . , 100-N can be instances of a number of different form templates. A form template can include a number of fields that are initially blank. As such, an instance of the form template can have a number of fields that are initially blank. However, the values that populate the fields in one of the number of forms 100-2, . . . , 100-N can be used to pre-populate a form that was created based on a same form template as one of the number of forms 100-2, . . . , 100-N. For example, if the form 100-2 is an instance of a networking form template, then the values that populate the fields in the form 100-2 can be used to populate a different instance of the networking form template. Each form template can have a number of different fields. For example, a first form template can have five fields while a second form template can have ten fields that are intended to describe a different problem than the fields in the first form template.

The search engine 104 can select a form 100-2, . . . , 100-N by correlating a number of subscriptions that are associated with the form 100-1 with a number of subscriptions associated with the number of forms 100-2, . . . , 100-N. A subscription is an offering provided by the provider. An offering is a product, a service, and/or an account provided by the provider.

A subscription can be associated with a form 100-1 through a user. For example, a user can purchase a product offering from the provider. The user can be subscribed with the provider via the product. A subscription allows a provider to gather information about the product and/or the user.

In a number of examples, a subscription can be used to associate a form with a category. A form 100-1 can be associated with a user and the user can be associated with the subscription such that the form 100-1 can be associated with the subscription. For example, if a user purchased a computing device from the provider and if the user provides a description, e.g., "I cannot connect to any wireless network", of a problem via field 102, then the search engine 104 can select forms that belong to "computing device" and "wireless network" categories. The subscription can be used to select forms that belong to a "computing device" category while the description can be used to select form that belongs to a "wireless network" category. That is, the subscription can be used to provide information to a provider regarding a number of offerings that are associated with the user and/or the form 100-1. The information from the subscription, input from the field 102, and/or information gathered from different sources can be used to associate the form 100-1 and/or the user with a category.

In a number of examples, geographical information, entity affiliation, and/or unit affiliations can be used to categorize the form 100-1. Geographical information can include information regarding a location from which the user is submitting form 100-1 and/or a location that can be associated with a user. Geographical information can include a region, a state, a city, a street, and/or a map coordinate among other forms geographical information. Entity affiliation can include information regarding an entity that is associated with a user. An entity can be an employer, a non-profit organization, a club, and/or a group, among other forms of social structures. A unit affiliation can include a unit within an entity. For example, a unit affiliation can be a sales department of an employer and/or a volunteering group within a non-profit organization.

Geographical information, entity affiliation, and/or unit affiliation can be used to categorize the form 100-1 with a geographical location, an entity, and/or a unit. The number of forms 100-2, . . . , 100-N can also be associated with categories based on geographical information, entity affiliation, and/or unit affiliation. It can be determined whether a portion of the number of forms 100-2, . . . , 100-N are associated with a specific time period and have been categorized with a similar category based on the geographical information, entity affiliation, and/or unit affiliation. For example, if a portion of the forms 100-2, . . . , 100-N have been have categorized with a first unit category and if the number of forms in the portion of the forms 100-2, . . . , 100-N is greater than a specified threshold within a specified time period, then a form 100-1 that is associated with the first unit can further be categorized with categories shared between the portion of the forms 100-2, . . . , 100-N. For example, if the portion of the forms 100-2, . . . , 100-N belong to a sales unit category and a wireless network category, if the portion of the forms 100-2, . . . , 100-N have been received within a last hour interval and if the form 100-1 belongs to a sales unit category, then the form 100-1 can also be categorized with a wireless network category in addition to the sales unit category.

In a number of examples, a search engine 104 can select a number of forms from the forms 100-2, . . . , 100-N based on a comparison of the input provided through the form 100-1, via the field 102 and/or other fields not shown, with the input provided through the number of forms 100-2 . . . , 100-N. The comparison of the input provided through the form 100-1 with the input provided through the number of forms 100-2, . . . , 100-N is independent of the categorization of the form 100-1 and the number of forms 100-2, . . . , 100-N. In FIG. 2, the number of selected forms can be presented to a user.

FIG. 2 illustrates a block diagram of an example of selecting a form according to the present disclosure. FIG. 2 includes a form 200-1, a search engine 204, and a database 206 which are analogous to form 100-1, search engine 104, and database 106 in FIG. 1.

The form 200-1 includes a field 202, a link 208-1, a link 208-2, and a link 208-3, e.g., referred to generally as links 208. Form 200-1 can be an instance of a basic form template. In a number of examples, the basic form template can optionally include the links 208. The links 208 can provide a lead to an instance of a pre-populated form.

The link 208-1 is a link to an instance of a form template that was used to create the form 202-2. A form template can be used to create a form when the form is based on the form template and/or when the form is made from the form template. The link 208-2 is a link to an instance of a form template that was used to create the form 202-3. The link 208-3 is a link to an instance of a form template that was used to create a form from the form 202-2, the form 202-3, . . . , the form 202-N, e.g., referred to generally as forms 202-2, . . . , 202-N.

The links 208 include a title of the form and a description of the form. A title of the form can be a title of an associated form template. A title of the form can be a title of a different form. For example, the title of link 208-1 can be the title of form 202-2. A description can be a listing of the categories that are associated with the form and/or the template from which the form was created. For example, a description in the link 208-1 can be a description of the form 200-2 and/or a form template from which form 200-2 was created. The links 208 can be links to forms that the search engine 204 selected to present to a user as describe in FIG. 1.

Figure 3:
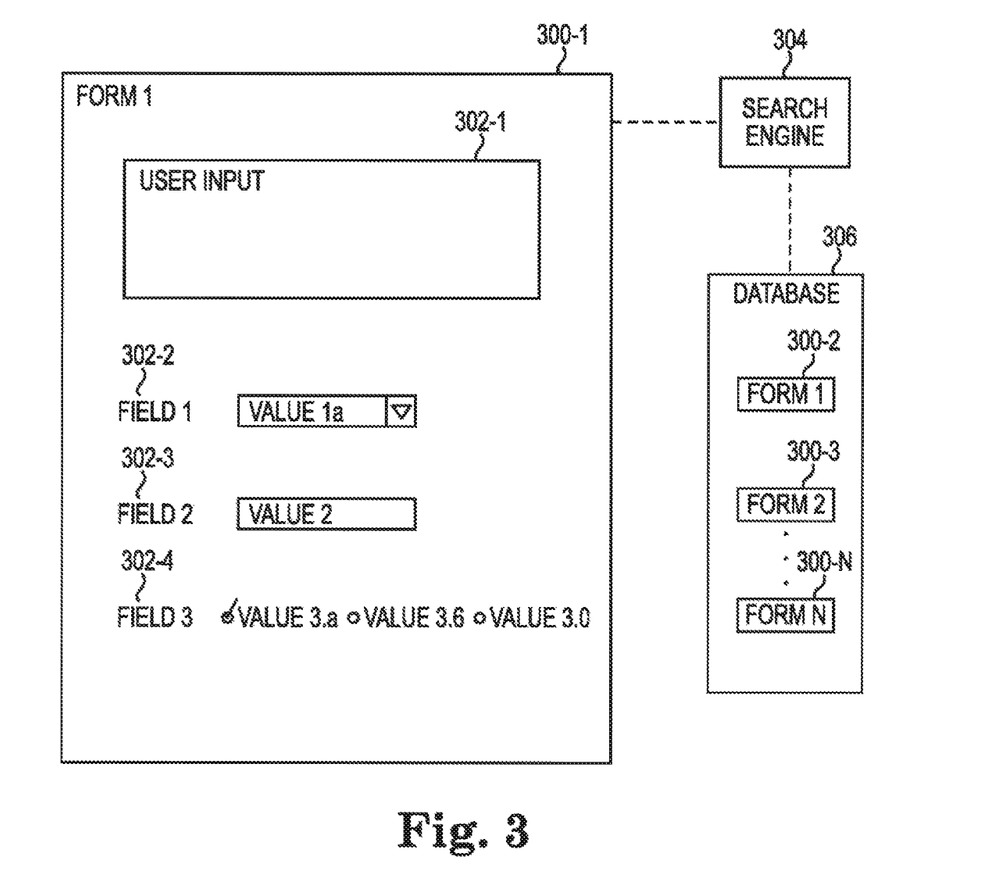
FIG. 3 illustrates a block diagram of an example of pre-populating a form according to the present disclosure.

The user can select one of the links 208 to create a pre-populated form. FIG. 3 shows the results of the selection of link 208-1. The user can also modify the input to field 202 to request that a new search is carried out. The user can modify the entire input to field 202 and/or a portion of the input to field 202. The search engine can receive the changes at intervals from form 200-1. For example, the search engine 204 can select a number of different forms from the forms 200-2, . . . , 200-N, based on a single modification to the input to field 202.

FIG. 3 illustrates a block diagram of an example of pre-populating a form according to the present disclosure. FIG. 3 includes a form 300-1, a search engine 304, and a database 306 which are analogous to form 100-1, search engine 104, and database 106 in FIG. 1 and form 200-1, search engine 204, and database 206 in FIG. 2.

The form 300-1 includes a field 302-1, a field 302-2, a field 302-3, and afield 304-4, e.g., referred to generally as fields 302. Each of the fields can be associated with a type. For example the fields 302-1 can accept text as an input, field 302-2 can accept a drop-down selection as an input, field 302-2 can accept text as an input, and field 302-4 can accept a radial button selection as input. Other types of fields can be used.

The form 300-1 is a pre-populated form. The form 300-1 is pre-populated because at least a portion of the values of the fields 302 are populated without requiring that the user provide the input. The values of the fields 302 can be obtained from a correlated form from the forms 300-2, . . . , 300-N. For example, the form 300-1 can be an instance of a form template that was used to create form 300-2. At least a portion of the value of the fields in the form 300-2 can be used to populate the fields 302 in the form 300-1.

Figure 4:
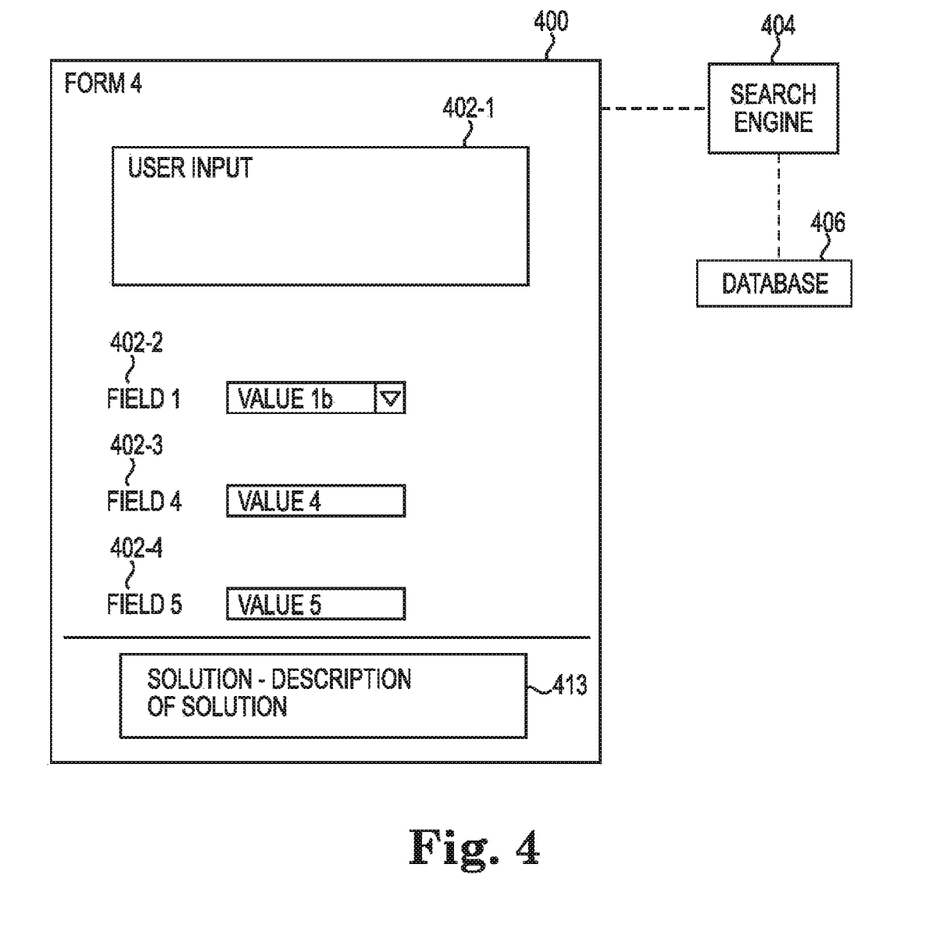
FIG. 4 illustrates a block diagram of an example of pre-populating a form according to the present disclosure.

A user can modify the values associated with the fields 302 before submitting the form to the provider as a ticket to be assigned to a representative. For example, the user can modify the input to field 302-1. Modifying any of the fields 302 can result in the search engine selecting a different portion of the forms 300-2, . . . , 300-N to present to the user via a computing device. If a user modifies the input in field 302-2 from "I cannot connect to any wireless network" to "I cannot connect to a server," then the search engine can categorize the form 300-1 based on the input provided by the fields 302 and select a number of forms with a corresponding category, for instance. In a number of examples, if a user modifies the input in the field 302-2, then the search engine can automatically create a new form and pre-populate the form. The automatically created new form can be based on a form template that was used to create a resolved form. FIG. 4 shows the automatic creation of a new form that is pre-populated in response to a change to the input in field 302-2.

FIG. 4 illustrates a block diagram of an example of pre-populating a form according to the present disclosure. FIG. 4 includes a form 400, a search engine 404, and a database 406 that are analogous to form 300-1, search engine 304 and database 306 in FIG. 3.

The form 400 can include a field 402-1 and a field 402-2 that are analogous to afield 302-1 and afield 302-2 in FIG. 3. The form 400 also includes a field 402-3 and afield 402-4. The values associated with the field 402-1, the field 402-2, the field 402-3, and the field 402-4, referred to generally as fields 402, can be pre-populated based on a selection of a resolved form that is stored in the database 406.

In a number of examples, form 400 can include a solution 413 to the problem that is described in form 400. The solution 413 can include a title and a description. The solution 413 can be a solution to a form that is resolved. The resolved form can be created from a form template that was used to create the form 400. The solution 413 can be confirmed, by a provider, to resolve a problem that the form 400 describes.

The user can submit the form 400 to a provider. The provider can assign a representative to resolve the problem expressed in form 400 based on the category associated with the form 400 and/or based on a resolved form. For example, if a representative resolved a first form and the first form was used to create the form 400 and to pre-populate the form 400, then a representative that resolved a problem associated with the first form can be assigned to resolve a problem associated with the form 400

Figure 5:
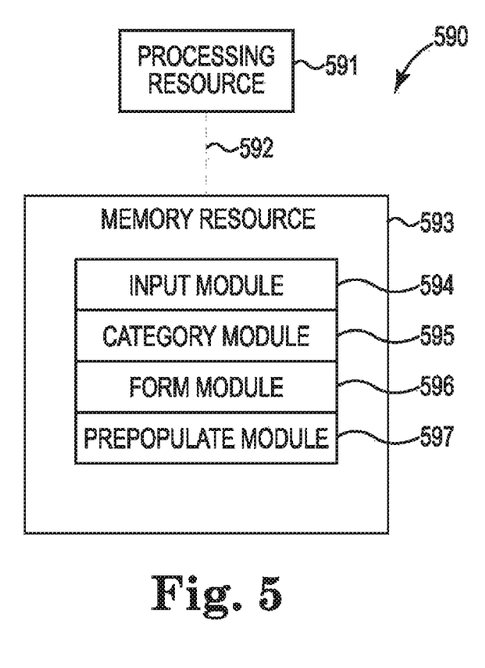
FIG. 5 illustrates a block diagram of an example of a computing device according to the present disclosure.

FIG. 5 illustrates a block diagram of an example of a computing device according to the present disclosure. The computing device 590 can utilize software, hardware, firmware, and/or logic to perform a number of functions described herein.

The computing device 590 can be any combination of hardware and program instructions configured to pre-populate a form. The hardware, for example can include a processor resource 591 and/or a memory resource 593, e.g., machine readable medium (MRM), database, etc. A processor resource 591, as used herein, can include any number of processors capable of executing instructions stored by a memory resource 593. The processor resource 591 may be integrated in a single device or distributed across multiple devices. The program instructions, e.g., machine-readable instructions (MRI), can include instructions stored on the memory resource 593 and executable by the processor resource 591 to implement a desired function, e.g., pre-populating a form.

The memory resource 593 can be in communication with a processor resource 591. A memory resource 593, as used herein, can include any number of memory components capable of storing instructions that can be executed by processor resource 591. Such memory resource 593 can be a non-transitory MRM. The memory resource 593 may be integrated in a single device or distributed across multiple devices. Further, the memory resource 593 may be fully or partially integrated in the same device as the processor resource 591 or it may be separate but accessible to that device and processor resource 591. Thus, it is noted that the computing device 590 may be implemented on a participant device, on a server device, on a collection of server devices, and/or on a combination of the participant device and the server device.

The memory resource 593 can be in communication with the processor resource 591 via a communication link, e.g., path, 592. The communication link 592 can be local or remote to a machine, e.g., a computing device, associated with the processor resource 591. Examples of a local communication link 592 can include an electronic bus internal to a machine, e.g., a computing device, where the memory resource 593 is one of volatile, non-volatile, fixed, and/or removable storage medium in communication with the processor resource 591 via the electronic bus.

A number of modules 594, 595, 596, 597 can include MRI that when executed by the processor resource 591 can perform a number of functions. The number of modules 594, 595, 596, 597 can be sub-modules of other modules. For example, the input module 594 and the category module 595 can be sub-modules and/or contained within the same computing device. In another example, the number of modules 594, 595, 596, 597 can comprise individual modules at separate and distinct locations, e.g., MRM, etc.

Each of the number of modules 594, 595, 596, 597 can include instructions that when executed by the processor resource 591 can function as a corresponding engine as described herein. For example, the input module 594 can include instructions that when executed by the processor resource 591 can function as an input engine.

In the example of FIG. 5, an input module 594 can comprise MRI that are executed by the processor resource 591 to receive an input that describes a problem from a user. The input can be received via a form and/or other standards of communication. A form can represent a ticket in a ticketing system. The form can be received at a computing device that is associated with a service provider, e.g., received by the serviced provider. The input can provide a description of the problem. The input can be entered into the form by a user. The input can be a description of a problem that is provided by the user to a provider.

A category module 595 can comprise MRI that are executed by the processor resource 591 to associate the input with a category. The category can be a description of the problem that is provided to the user by a provider. That is, the category can be a description, provided to the user by the provider, of the input, e.g., problem description.

In a number of examples, the input, the form, and/or a user subscription can be associated with a category. The user subscription can be an offering provided by the provider. An offering can be a product, a service, and/or an account provided by the provider.

In a number of examples, an account provided by the provider can include a profile and/or an account with a social media website. The account can contain information such as a name, a birthday, a geographical location, a time zone, a phone number, and/or an address, among other types of information in a user account. In a number of examples, a search engine can associate the input, the form, and/or the user with a category.

A select module 596 can comprise MRI that are executed by the processor resource 591 to select a form based on the category. The form can be selected from a number of resolved forms. A form can be considered resolved after a representative of the provider has verified that the problem associated with the form has been resolved. A selected form can be selected based on the correlation between an input provided via a form that is received form the user and an input provided via a form that is resolved.

A pre-populate module 597 can comprise MRI that are executed by the processor resource 591 to pre-populate the form based on a form input provided by a different user to a different form belonging to a same category as the form. The pre-populated form can be an instance of a form template that was used to create the resolved form.

In a number of examples, the provider can provide a solution to the user. The solution includes a solution used to resolve the resolved form. The solution can be confirmed by a representative of the provider.

Figure 6:
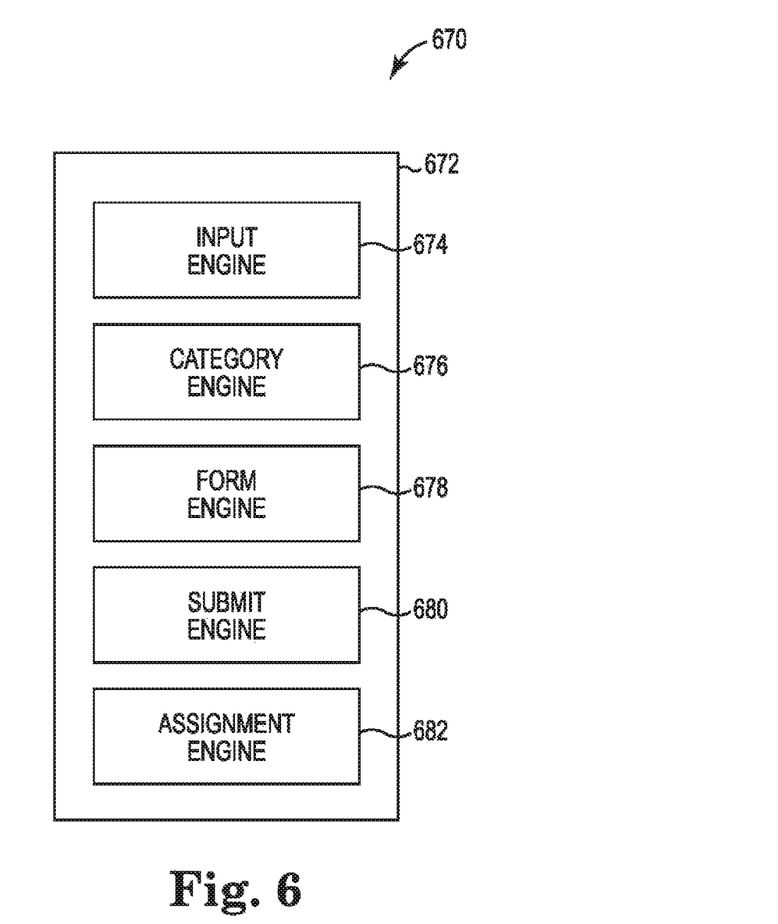
FIG. 6 illustrates a block diagram of an example of a system for pre-populating a form according to the present disclosure.

FIG. 6 illustrates a block diagram of an example of a system for pre-populating a form according to the present disclosure. The system 670 can include a computing system 672, and/or a number of engines 674, 676, 678, 680, 682. The computing system 672 can include the number of engines, e.g., input engine 674, category engine 676, form engine 678, submit engine 680, assignment engine 682, etc. The computing system 672 can include additional or fewer engines than illustrated to perform the various functions described herein.

The number of engines can include a combination of hardware and programming that is configured to perform a number of functions described herein, e.g., pre-populate a form, etc. The programming can include program instructions, e.g., software, firmware, etc., stored in a memory resource, e.g., machine readable medium, etc. as well as hard-wired program, e.g., logic.

The input engine 674 can include hardware and/or a combination of hardware and programming to receive input from a user. The category engine 676 can include hardware and/or a combination of hardware and programming to associate the input with a category. In a number of examples, the input and/or a user context can be associated with the category. A user context can include a geographical location, an entity affiliation, and/or a unit affiliation, as well as other forms of information that are associated with the user.

The form engine 678 can include hardware and/or a combination of hardware and programming to select a pre-populated form from a number of pre-populated forms that have been confirmed resolved by a provider, wherein the pre-populated form is selected based on the category. In a number of examples, a pre-populated form can be selected by comparing the input and the user context that is associated with a user with a number of inputs and a number of user contexts that are associated with a number of other users without comparing categories. For example, a first input provided by a first user can be compared with a second input provided by a second user to determine whether the inputs are sufficiently similar to use a resolved form that is associated with the second input at a template for a form that can be populated with the values of the resolved form.

The submit engine 680 can include hardware and/or a combination of hardware and programming to submit the pre-populated form to the provider. The assignment engine 682 can include hardware and/or a combination of hardware and programming to assign the pre-populated form to a representative of a provider.

Figure 7:
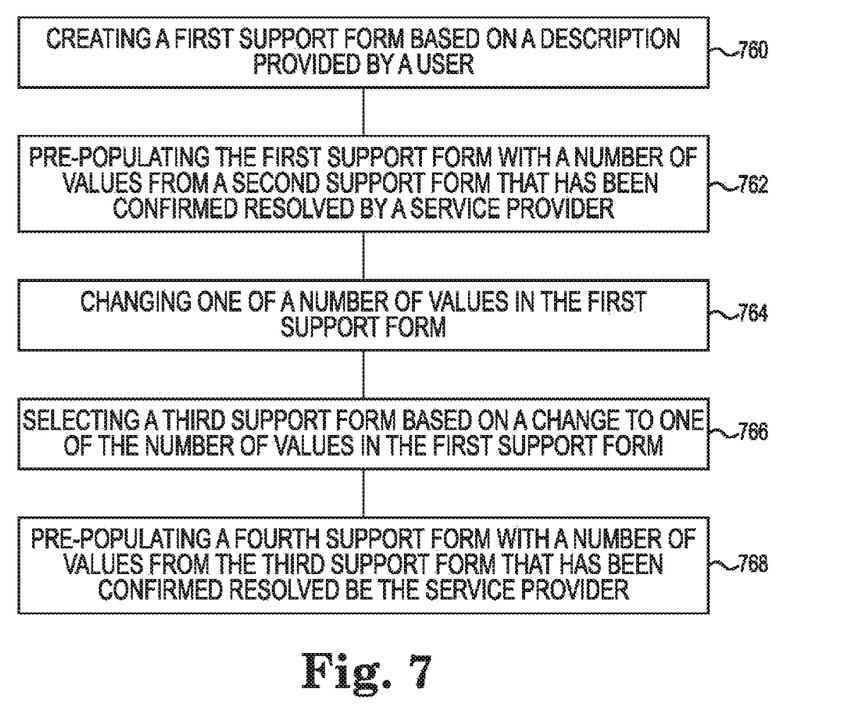
FIG. 7 illustrates a flow diagram of an example of a method for pre-populating a form according to the present disclosure.

FIG. 7 illustrates a flow diagram of an example of a method for pre-populating a form according to the present disclosure. At 760, a first support form can be created based on a description provided by the user. A support form can be a form that is intended to be used to create a ticket with a ticketing system that is used to receive information about problems, assign a representative to resolve the problem, track the problem, and resolve the problem. The first support form can be created based on a form template that was used to create a second support form.

At 762, the first support form can be pre-populated with a number of values from a second support form that has been confirmed resolved by a service provider, e.g., a representative of the service provider. The first support form and the second support form can be created from a same form template. That is, the fields in the first support form and the fields in the second support form can function similarly and the first support form and the second support form can be used to create a same type of ticket. For example, the first support form and the second support form can be used to report a database problem. The first support form may be missing a number of inputs to a number of fields while the second support form may have all or a portion of the fields populated. The value of the fields in the second support form can be used to pre-populate the first support form.

At 764, one of a number of values in the first support form can be changed and/or modified. Changing one of the number of values can include making a change to one of the number of values based on an interaction between the user and a product. For example, a user can change a setting on a product. The product can report the change to the form and the form can make a change to a value that is associated with a corresponding field.

At 766, a third support form can be selected based on a change to one of the number of values in the first support form. In a number of examples, the third support form can be selected based on a change the description provided by the user.

At 768, a fourth support form can be pre-populated with a number of values from the third support form. The third support form can have a resolved status. The resolution of the third support form can be confirmed by the service provider.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A non-transitory machine-readable medium storing instructions for pre-populating a form executable by a machine to cause the machine to:

receive a first input that describes a problem from a first user;

associate a category with the first input;

select a first form based on the category; and pre-populate the first form based on a second input provided by a second user to a second form, wherein the second form is associated with a problem that has been confirmed resolved and the second form belongs to the category.

2. The medium of claim 1, wherein the instructions executable to receive the first input from the first user include instructions to define the first input as a problem description and associate the category with the problem description, wherein the category characterizes the problem description and is provided to the first user a provider.

3. The medium of claim 1, wherein the provider is an entity that receives the input from the user.

4. The medium of claim 3, wherein the instructions to apply unsupervised relationship learning includes instructions to associate the number of weights with the number of first-order logic formulas wherein each of the number of weights is associated with one of the number of first-order logic formulas.

5. The medium of claim 4, wherein the subscription of the first user includes an offering provided by a provider, wherein the offering is a product, a service, or an account.

6. The medium of claim 1, wherein the instructions executable to select the first form include instructions to select the first form from a number of forms that are confirmed resolved by a provider.

7. The medium of claim 1, wherein the instructions are executable to provide a solution to the first user, wherein the solution was used to resolve a problem associated with the second form.

8. A system for providing resources comprising a processing resource in communication with a non-transitory machine readable medium having instructions executed by the processing resource to implement:

an input engine to receive an input from a user;

a category engine to categorize the input;

a form engine to select a pre-populated form from a number of pre-populated forms that have inputs provided by users and are associated with problems that have been confirmed resolved by a provider, wherein the pre-populated form is selected based on the category;

a submit engine to submit the pre-populated form to the provider; and an assignment engine to assign the pre-populated form to a representative of a provider.

9. The system of claim 8, including instructions to implement the category engine to associate the input and a user context with the category.

10. The system of claim 9, wherein the user context includes a geographical location, an entity affiliation, and a unit affiliation.

11. The system of claim 9, including instructions to implement the forms engine to select a pre-populated form by comparing the input and the user context that is associated with a user with a number of inputs and a number of user contexts that are associated with a number of other users.

12. The system of claim 11, wherein the number of other users are associated with a number of pre-populated forms that are confirmed as resolved by the provider.

13. A method for pre-populating a form comprising:

creating a first support form based on a description provided by a user;

pre-populating the first support form with a number of values from a second support form that has been confirmed resolved by a service provider;

changing one of a number of values in the first support form;

selecting a third support form based on a change to one of the number of values in the first support form; and pre-populating a fourth support form with a number of values from the third support form, wherein the number of values from the third support form have been provided by a user and the third support form is associated with a problem that has been confirmed resolved by the service provider.

14. The method of claim 13, wherein the method includes changing the one of the number of values based on an interaction between the user and a product.

15. The method of claim 14, wherein changing the one of the number of values from the first support form includes making a change to the description provided by the user.

* * * * *